R. P. CHAMPNEY.
DRIVING BELT.
APPLICATION FILED FEB. 20, 1917.
1,282,189.
Patented Oct. 22, 1918.
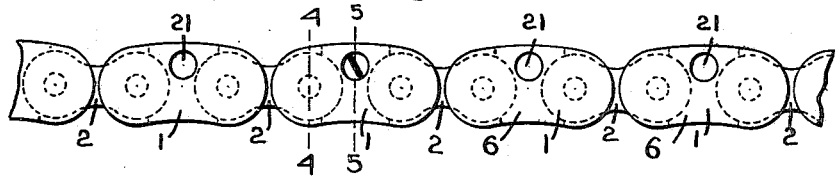
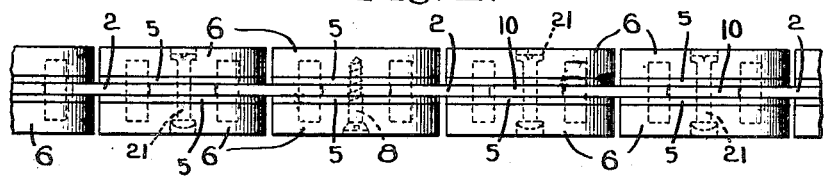
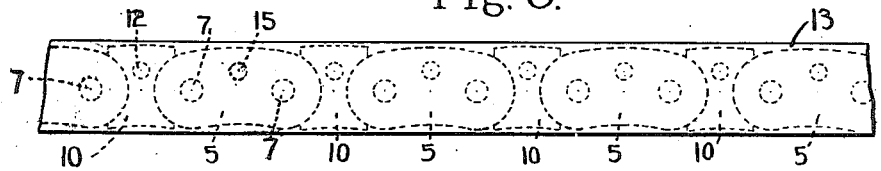
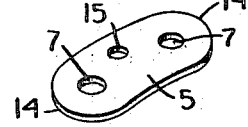
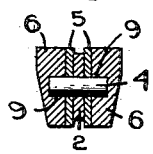
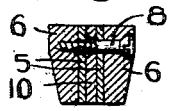
Inventor.
Ralph P. Champney
by Heard Smith & Tennant
Attys.

UNITED STATES PATENT OFFICE.

RALPH P. CHAMPNEY, OF WORCESTER, MASSACHUSETTS.

DRIVING-BELT.

1,282,189.　　　　　Specification of Letters Patent.　　Patented Oct. 22, 1918.

Application filed February 20, 1917. Serial No. 149,932.

*To all whom it may concern:*

Be it known that I, RALPH P. CHAMPNEY, a citizen of the United States, residing at Worcester, county of Worcester, State of Massachusetts, have invented an Improvement in Driving-Belts, of which the following description, in connection with the accompanying drawing, is a specification, like characters on the drawing representing like parts.

This invention relates to driving belts of the link type and particularly to so-called V-belts of the link type, and the principal object of the invention is to provide a novel belt of this nature which is non-stretchable and in which the metallic link members have engagement only with non-metallic elements, thus eliminating much of the wear and making a belt which needs no lubrication. Other objects of the invention are to provide an improved belt of this nature, all as will be more fully hereinafter set forth.

In order to give an understanding of the invention, I have illustrated in the drawings a selected embodiment thereof which will now be described, after which the novel features will be pointed out in the appended claims.

Figure 1 of the drawings is a side view of a portion of a belt embodying my invention;

Fig. 2 is an edge view thereof;

Fig. 3 is a view of a strip of non-stretchable, non-metallic material showing the manner in which the non-stretchable elements of the belt may be cut therefrom;

Fig. 4 is a section on the line 4—4, Fig. 1.

Fig. 5 is a section on the line 5—5, Fig. 1;

Fig. 6 is a perspective view of one of the non-metallic, non-stretchable elements of the belt;

Fig. 7 is a perspective view of one of the metallic links;

Fig. 8 is a perspective view of the spacing member situated between the ends of the metallic links;

Fig. 9 is an edge view of the metallic link shown in Fig. 7.

My improved belt is of that type comprising a plurality of connected links, the alternate links being friction-producing links having the friction faces of the belt, and the other links being in the nature of metallic connecting links which connect the friction-producing links. In Fig. 1, the friction-producing links are indicated generally at 1, and the metallic connecting links at 2.

The metallic connecting links have the shape shown in Figs. 7 and 9, that is, each link is provided with the rounded ends 3 which are preferably formed on the arc of a circle and is also provided at each end with oppositely-disposed pivot pins or projections 4 which are preferably situated at the center of the arcuate ends 3. The friction-producing links 1 each comprise two elements 5 of some non-metallic, non-stretchable material, such, for instance, as fiber, and two facing elements 6 of leather or some other friction material which overlie the outside faces of the elements 5 and form the friction faces of the belt. The two non-metallic, non-stretchable elements 5 of each link 1 are provided with apertures 7 adapted to receive the pivot projections 4, and in the complete belt, the ends of the metallic links 2 are situated between the two elements 5 of the adjacent friction-producing links 1. The non-stretchable elements or stretch-giving elements 5 and the friction elements 6 of each link 1 are all connected together in some suitable way so as to make a unitary link structure, and while any suitable means for thus connecting these elements together might be used, I will preferably employ for this purpose either rivets 21 or screws 8. Where the rivets are used, they will extend through both friction members 6 and the strength-giving element 5 of each link and will thus permanently secure these parts together. Where the screws 8 are used they will extend through one of the friction members 6, through both strength-giving elements 5 and will screw into the other friction member 6. The screw provides a detachable connection while the rivet provides a permanent connection. The advantage of the detachable connection is that it permits the belt to be opened, for if the screw for any link 1 is removed, then the two friction members 6 and also the two strength-giving elements 5 of said link can be removed from the pins 4 of the two adjacent metal links 2. This will open the belt at this point. I will preferably make a certain number of the friction links with the screw construction for holding the parts of the link together so that the belt can be opened at various points if desired. This will facilitate the placing of the belt around or taking it off from pulleys.

The pins 4 are longer than the thickness of the strength-giving elements 5 so that the ends of said pins are received in sockets 9 formed in the friction elements 6, I will preferably provide means for spacing the strength-giving elements 5 by means of a spacer which is situated between the ends of the metallic links 2 and is of a thickness equal to the thickness of said links, these spacers holding the elements 5 of each link 1 properly spaced, and thus preventing any undue friction between them and the metallic links 2. These spacing elements are indicated at 10 and they may be either integral with one of the elements 5 or may be separate. I will preferably make the spacers 10 as separate pieces because this facilitates and cheapens the manufacture. One of these spacers is shown in perspective in Fig. 8 and it is shaped to present the two concavely-curved sides 11 which fit the curved ends 3 of the metallic links 2, and it is also provided with an aperture 12 through which the screw 8 or rivet 21 is adapted to pass. These spacing elements 10 will be held in place partly by their shape and partly by the screws 8 or rivets 21. Where the spacing elements 10 are separate from the non-metallic, strength-giving elements 5, it is possible to cut the elements 5 and spacing elements 10 from a strip 13 of fiber or other material without any appreciable loss of material. The way in which this may be done is illustrated in Fig. 3 wherein I have shown in dotted lines the way in which the strip 13 may be cut up to form the two elements 5 and 10. In making the elements 5, the curvature of the ends 14 thereof may be substantially the same as that of the ends 3 of the metallic link 2, and when this construction is employed, the elements 5 can be cut or died out of the strip 13 at suitable intervals so that the piece of the strip which is left between the places from which two adjacent elements 5 are cut will form one of the spacing elements 10. Both of the spacing elements 10 and the strength-giving elements 5 may thus be produced from the same strip 13 without any loss of material. These elements will preferably be cut from the strip 5 by means of suitable dies, and the dies will be properly shaped so as to form in the elements 5 the apertures 7 for the pins 4 and the aperture 15 for the screw 8 or rivet 21, and in the spacing element 10 the aperture 12 for the screw 8 or rivet 21. Where this construction is employed, the thickness of the elements 5 will, of course, be approximately the same as that of the metallic link 2.

In a belt constructed as above described, the longitudinal strain on the belt will come on the metallic links 2 and on the non-stretchable, strength-giving elements 5, and as these elements 5 are made of fiber or some other material which has non-stretchable qualities, the result will, of course, be a non-stretchable belt. Moreover, the metallic links 2 have frictional engagement only with the non-metallic elements 5 and thus no lubrication of the belt is required to keep it flexible, as would be the case if it contained metal-to-metal surfaces. Further, where the elements 5 are made of fiber, they are practically indestructible because they are not susceptible to wear.

A belt embodying my invention can be made at a comparatively-small expense and it has the desirable characteristic of being non-stretchable, while at the same time, the friction surfaces of the belt are formed entirely of suitable friction-producing material, such as leather.

I claim:

1. A non-stretchable belt of the link type presenting a plurality of connecting links, each alternative link being of metal and having integral therewith at each end two oppositely disposed pivot pins, and the other links constituting friction-producing links and each comprising two non-stretchable, non-metallic elements having parallel faces and provided with apertures of a size to receive and fit the pivot pins of adjacent metallic links, and a facing of leather overlying the outer face of each non-metallic element and provided with pivot-pin-receiving recesses on its inner face, and means separate from said pivot pins and situated between the ends of the metallic links for securing together the elements of the friction-producing links, said pivot pins extending through the non-metallic elements and into the recesses formed in the inner face of the leather facings, and the connection between the various links being such that the longitudinal strain to which the belt is subjected is taken entirely by the metallic links and non-metallic elements.

2. A non-stretchable belt of the link type presenting a plurality of connected links, each alternate link being of metal and having oppositely-disposed pivot pins extending from each end, and the other links constituting friction-producing links, and each comprising two non-stretchable, non-metallic elements spaced from each other to receive the ends of the adjacent metallic link elements and having apertures to receive the pivot pins of said adjacent metallic link elements, a spacing member interposed between said two non-metallic elements and between the ends of the metallic links connected thereto, a facing of leather overlying the outer face of each non-metallic element, and means securing together the leather facings, non-metallic elements, and spacer of each friction-producing link.

In testimony whereof I have signed my name to this specification.

RALPH P. CHAMPNEY.